United States Patent [19]

Wolf

[11] Patent Number: 5,002,348
[45] Date of Patent: Mar. 26, 1991

[54] SCANNING BEAM OPTICAL SIGNAL PROCESSOR

[75] Inventor: William E. Wolf, Chesapeake City, Md.

[73] Assignee: E. I. Du Pont de Nemours and Company, Wilmington, Del.

[21] Appl. No.: 356,820

[22] Filed: May 24, 1989

[51] Int. Cl.$^5$ .................. G02B 26/10; G02B 27/42
[52] U.S. Cl. ..................... 350/6.5; 350/6.6; 350/6.91; 350/3.71; 350/162.12; 250/230; 250/201.1; 356/71
[58] Field of Search .................. 350/6.5, 6.6, 6.4, 6.7, 350/6.8, 6.91, 3.71, 3.62, 162.12, 162.13; 250/230, 235, 236, 201.1; 356/71, 448; 358/481, 296; 369/44, 101, 121, 45

[56] References Cited

U.S. PATENT DOCUMENTS

| | | | |
|---|---|---|---|
| 3,321,766 | 5/1967 | Everest | 346/32 |
| 3,779,631 | 12/1973 | Shupe | 350/162.13 |
| 3,879,131 | 4/1975 | Cuthbert et al. | 356/106 R |
| 4,152,588 | 5/1979 | Klatt et al. | 250/230 |
| 4,264,809 | 4/1981 | Fearnside | 250/201.1 |
| 4,279,472 | 7/1981 | Street | 250/201.1 |
| 4,337,994 | 7/1982 | Brasier | 350/3.71 |
| 4,436,370 | 3/1984 | Rebholz et al. | 350/162.12 |
| 4,466,088 | 8/1984 | Trethewey | 369/46 |
| 4,468,093 | 8/1984 | Brown | 350/162.12 |
| 4,556,964 | 12/1985 | Trethewey | 369/44 |
| 4,695,722 | 9/1987 | Motooka | 250/235 |
| 4,863,226 | 9/1989 | Houpt et al. | 350/6.5 |
| 4,869,574 | 9/1989 | Hartman | 350/162.13 |
| 4,873,435 | 10/1989 | Ono et al. | 250/235 |

OTHER PUBLICATIONS

Jensen et al., Scientific American, article titled "Side--Looking Airborne Radar", pp. 84-95.
Almeida et al., "Applications of Optical Fourier Transforms," edited by Henry Stark, pp. 73-81.
Das et al., "Applications of Optical Fourier Transforms," edited by Henry Stark, pp. 324-327.
Psaltis, "Optical Disk Based Correlation Architectures," Proceedings of the OSA Topical Meeting on Optical Computing, pp. 206-209.
Streibl et al, "Techniques for Array Illumination," Proceeding of the OSA Topical Meeting on Optical Computing, pp. 160-163.
Gotlieb et al., "Electro-Optic and Acousto-Optic Scanning and Deflection," pp. 158-175.
Jenkins, et al., "Fundamentals of Optics," Fourth Edition, pp. 597-601.
Kingslake, "Lens Design Fundamentals," pp. 112 and 113.
Goodman, "Introduction to Fourier Optics," pp. 170-177.
D'Azzo et al., "Feedback Control System Analysis and Synthesis," pp. 108 and 109.
Bardos, "Wideband Holographic Recorder," Applied Optics, vol. 13, No. 4, Apr. 1974, pp. 832-840.

Primary Examiner—Bruce Y. Arnold
Assistant Examiner—Loha Ben

[57] ABSTRACT

The present invention relates to a scanning beam optical processing system which combines Fourier optics with the ability to scan a stationary object plane. A scanning system moves a beam of light over a stationary medium and directs the light to a beam deflector. A descanning position control system re-establishes the beam deflected from the beam deflector along a stationary optical path for optical processing of information obtained from the medium. Hyperbolic lenses are used in the scanning system. The descanning position control system includes a controller comprising a detector for sensing a portion of the beam deflected from the beam deflector and for generating a signal representative of the position thereof and a differential amplifier for comparing the signal representative of the position of the deflected beam of light with a signal representative of the predetermined fixed reference axis for generating a beam deflector drive signal in response thereto.

42 Claims, 14 Drawing Sheets

SCANNING BEAM OPTICAL SIGNAL PROCESSOR

BACKGROUND OF THE INVENTION

1. Field of the Invention

The present invention relates to a control system for a beam deflector and, in particular, to a control system for a Fourier optical processor that positions a deflected scanning beam of light onto a predetermined fixed reference axis.

2. Description of the Prior Art

The application of Fourier optical techniques to signal and image processing is well known. A two dimensional Fourier transform of a scene or image can be obtained with a simple lens. Since every point in the image is acted upon at the same instant in time, this transformation is said to be a parallel, single step operation. This instantaneous image transformation makes the concept of processing data or images in this manner very attractive. Image processing functions can be accomplished using spatial filters in combination with lenses.

A conventional prior art Fourier optical processor generally indicated at 400 in FIG. 1, includes an input optical path 500, a Fourier optical filter 600 and a Fourier optical correlator 700. In such a system the light beam does not move, the input is transformed in a single step, and the processed output is applied to a detector. Small features in the input scene are detectable based upon how much energy is diffracted into the spatial frequency bands where the features are separable.

One or more spatial filters, such as that indicated at 602, and one or more correlation filters, such that indicated at 702, may have either a simple or complex transfer function when used in a Fourier optical processor 400. Spatial filters having only amplitude components in their transfer function are known as "simple" spatial filters. Spatial filters having both amplitude and phase components in their transfer function are referred to as "complex" spatial filters.

The simple spatial filter attenuates certain spatial frequencies and thus enhances certain features of the input image. Complex spatial filters, which can be made using holographic techniques, allow other mathematical operations to be performed in a similar parallel manner. Complex spatial filters of almost any desired transfer function can be realized in practice. This gives optical spatial filters the same broad capabilities as their electrical filter counterparts.

A number of practical difficulties arise which cause problems when attempting to solve real problems with Fourier techniques. Fourier systems are usually difficult to adjust for scale, rotation and other alignment problems. As with any Fourier technique, the energy in the features that are of interest may be quite small and thus cause difficulties in detection and/or classification. There are, however, a number of successful applications of Fourier optical techniques. For example Synthetic Aperture Radar signal processing and similar sonar applications are described in Jensen, H. J., Graham, L. C., Porcello, L. J., Leith, E. N. "Side-looking Airborne Radar", Scientific American, volume 237, pages 84–95, Oct. 1977 and an optical pattern recognition system for the identification of diatoms is described in Almeida, S. P., and Indebetouw, G., "Pattern Recognition via Complex Spatial Filtering", in Stark, H., ed., *Applications of Optical Fourier Transforms*, Academic Press, 1982, pages 73–81.

Various arrangements have been used to scan a light beam. For example, acousto-optical devices and galvanometer driven, rotationally oscillating mirror light beam scanners, are known. To achieve high precision scanning, servo-controlled galvanometer scanners have been used. U.S. Pat. No. 3,321,766 (Everest) discloses a closed loop galvanometer servo system used in an oscillographic recording apparatus to move a mirror to reflect a beam of light from a fixed source along a path in accordance with a varying applied signal. A portion of the light reflected from the mirror is directed onto an electro-optical potentiometer to produce a beam position signal which is representative of the position of the reflected light beam. The galvanometer is driven in response to the difference between the applied signal and the position signal from the electro-optical potentiometer.

In other scanning applications either separate light beams or coaxial light beams of different wavelengths have been used to produce the reflected beam position signal. Such techniques have been used to position a galvanometer driven mirror for track selection in an optical disk system. See, for example, U.S. Pat. Nos. 4,466,088 and 4,556,964 (both to Trethewey).

The number of problems solveable using Fourier optical techniques could be greatly increased if Fourier optics could be combined with a scanning light beam. Optical processing using spatial filters requires that the pattern of light impinging upon the spatial filter remain stationary so that the beam remain aligned with the optical components, such as spatial filters, correlators and detector arrays. But in a scanning beam system the pattern is not stationary.

The traditional approach to combine scanning with Fourier optics for scanning an object plane has been to use a stationary light beam with a mechanical transport to move the object or medium to be scanned. The use of a two axis positioning stage to mechanically move the medium to be scanned, as described by Das, P. and Ayub, F. M. M., "Fourier Optics and SAW Devices", in Stark, H., ed., *Applications of Optical Fourier Transforms*, Academic Press, 1982, pages 324–327, has the disadvantages of slow scanning speed, expense and complexity. The use of a rotating optical disk to perform the scanning function as described in Psaltis, D., "Optical disk Based Correlation Architectures", Proceedings of the OSA Topical Meeting on Optical Computing, Feb. 27- Mar. 1, 1989, Optical Society of America, pages 206–209, still requires a moving medium with all of its associated practical difficulties.

When a scanning light beam is used with a stationary object plane the light beam moves in space. To hold the light beam stationary at the detector the scanning motion of the beam must be precisely complemented with a descanning motion.

One prior art example of descanning in the context of optical processing is U.S. Pat. No. 3,879,131 (Cuthbert et al.) which attempts to solve the descanning problem by simultaneously driving two galvanometers, the first to perform the scanning function, and the second to perform the descanning function. The second galvanometer has a motion complementary to the first. A galvanometer driver circuit that seeks to drive both galvanometers in synchronism, but one hundred eighty degrees out of phase. However, nominally identical galvanometers of the same model may differ slightly in their static response, but may differ greatly in their dynamic response to a given input drive signal. To eliminate these differences in response would require either specially selected matched pairs of galvanometers or special compensating circuitry. Moreover, even matched pairs of galvanometers may suffer from different hysteresis and temperature effects which make it very difficult to operate two devices synchronously throughout any reasonable range of operating conditions.

Accordingly, in view of the foregoing it is believed desireable to provide a scanning beam arrangement for use in a Fourier optical processor. It is also believed desireable to provide an arrangement for holding the reflected beam from a rotatable mirror, or the beam deflected from an acousto-optical device, along a stationary axis in space.

SUMMARY OF THE INVENTION

The present invention is, in one aspect, directed to a controller for controlling a beam deflector, typically in the form of a rotatable mirror or an acousto-optic device, to cause a beam of light deflected therefrom to propagate along a predetermined fixed reference axis. The controller may be advantageously used in combination with an optical system having a beam scanner for scanning a beam of light and a descanning beam deflector for deflecting a beam of light about a predetermined axis in response to a beam deflector drive signal, and focussing means for causing a scanning beam of light impinging on the focussing means to be focussed to a point on the beam deflector and to be incident on that point at a varying angle lying within a predetermined range. The focal point lies on the axis of the beam deflector. The controller comprises a detector for sensing a portion of the beam deflected from the focal point on the beam deflector and for generating a signal representative of the position thereof and a differential amplifier for comparing the signal representative of the position of the deflected beam of light with a signal representative of the predetermined fixed reference axis for generating a beam deflector drive signal in response thereto. A beam splitter is used to split the beam of light deflected from the beam deflector into a first and a second portion and to direct the first portion toward the detector.

In another aspect the invention relates to a Fourier optical processor having a controller of the type discussed above in a descanning system whereby a scanning optical beam may be used to scan a stationary medium. The controller may be utilized to reestablish a stationary optical path for optical processing of image information carried by the light beam.

The scanning system includes hyperbolic lenses to eliminate spherical aberrations at the design wavelength and to improve the quality of complex spatial filters used in the processing section of the system. An encoding arrangement is provided to separate the light beam carrying the image information from the light beam carrying the beam position sensing information.

As a result, the Fourier optical processor in accordance with the present invention may be used in various applications, including image processing, inspection, optical memory systems and optical data processing applications. The Fourier optical processor in accordance with the present invention is believed to have the advantages of being less complex and less costly than the prior art systems which utilize a moving object plane.

Since the Fourier optical processor of the present invention can also be used to scan a medium which is moving, for example a sheet of film which is being transported in a direction orthogonal to the plane of the scanning beam, a two dimensional scan of an object may be achieved with only a single axis transport apparatus.

BRIEF DESCRIPTION OF THE DRAWINGS

The invention will be more fully understood from the following detailed description thereof, taken in connection with the accompanying drawings, which form a part of this application, and in which.

DETAILED DESCRIPTION OF THE PRESENT INVENTION

Figure 1:
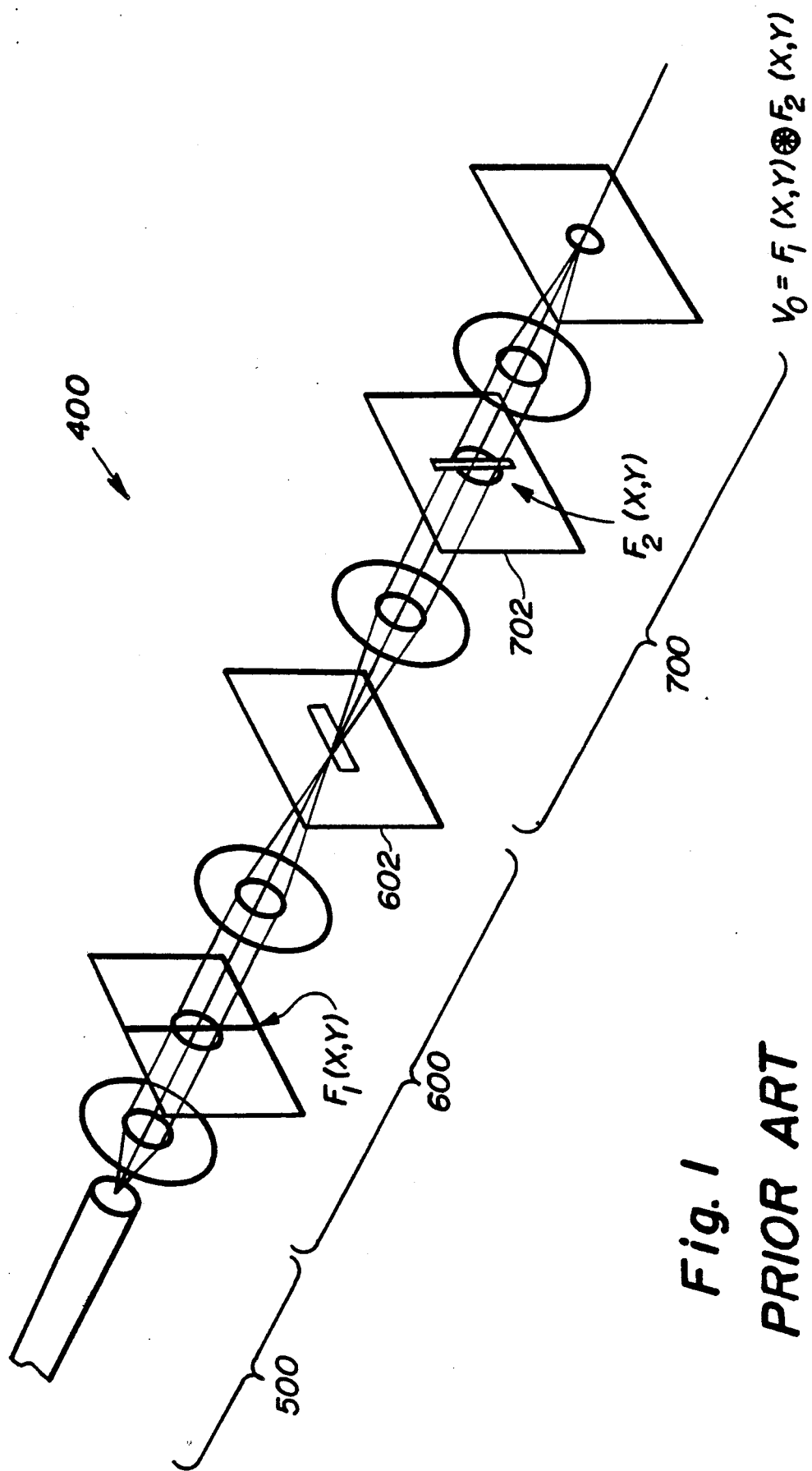
FIG. 1 is a stylized perspective representation of a fixed beam conventional Fourier optical processor.

Throughout the following detailed description similar reference numerals refer to similar elements in all figures of the drawings.

Figure 2:
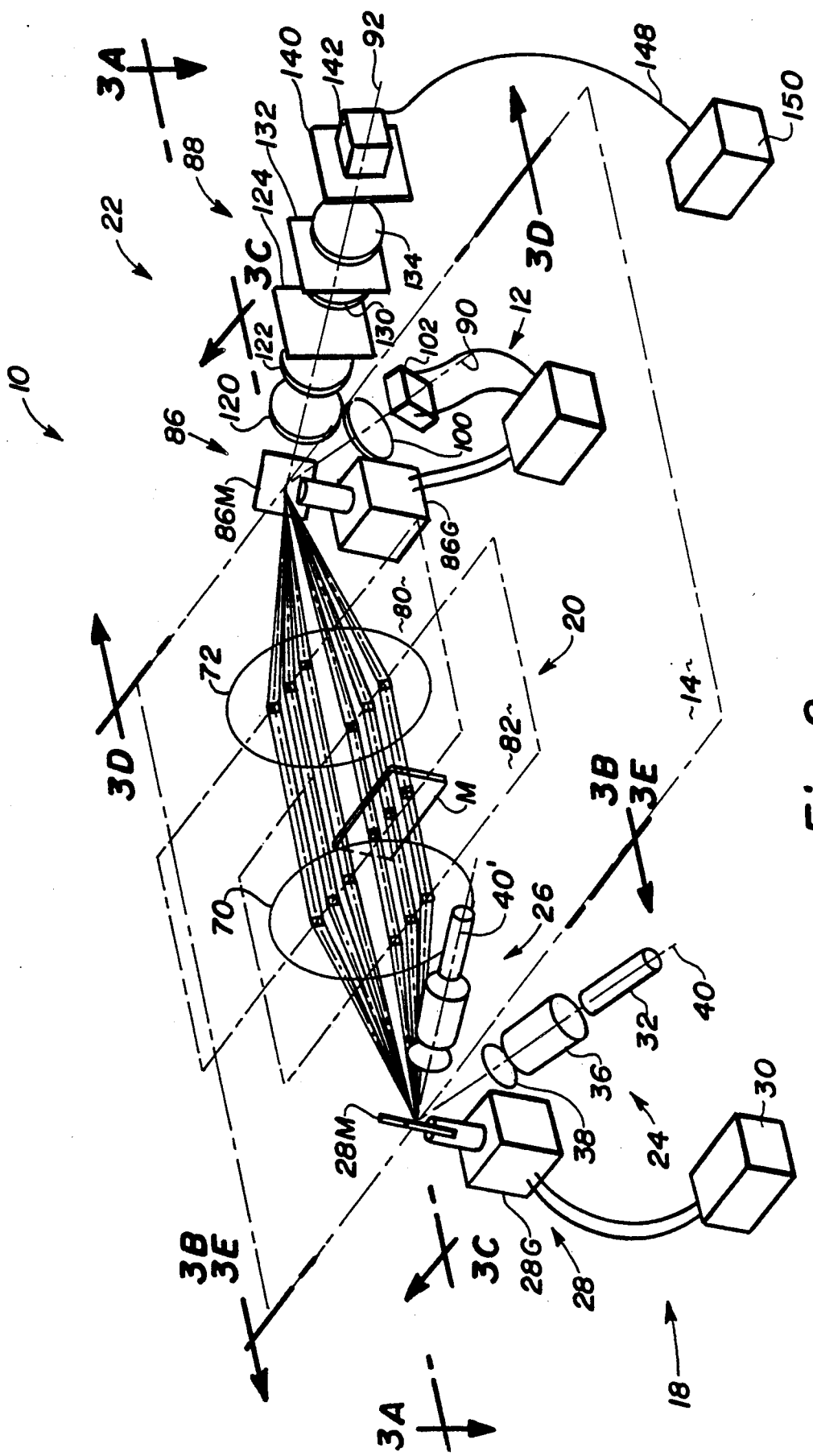
FIG. 2 is a perspective view of a scanning beam optical processor having a descanning beam deflector control system in accordance with the present invention, wherein the beam deflector takes the form of a rotatable mirror.

Shown in FIGS. 2 and 3 is a scanning beam optical processor 10 having a descanning beam deflector control system generally indicated by the reference character 12 in accordance with the present invention. The operative elements of the optical processor 10 are arranged about a reference plane 14. In FIG. 2 the plane 14 appears in full while in FIGS. 3B through 3E the plane appears as a reference line. In FIG. 3A the reference plane 14 is parallel to the plane of the drawing.

Referring to FIGS. 2 and 3 the optical processor 10 includes, similar to the arrangement discussed in connection with FIG. 1, an input optical path 18, an Fourier optical filter 20 and a Fourier optical correlator 22. These elements are generally analogous to elements 500, 600, and 700 of FIG. 1.

Figure 3B:
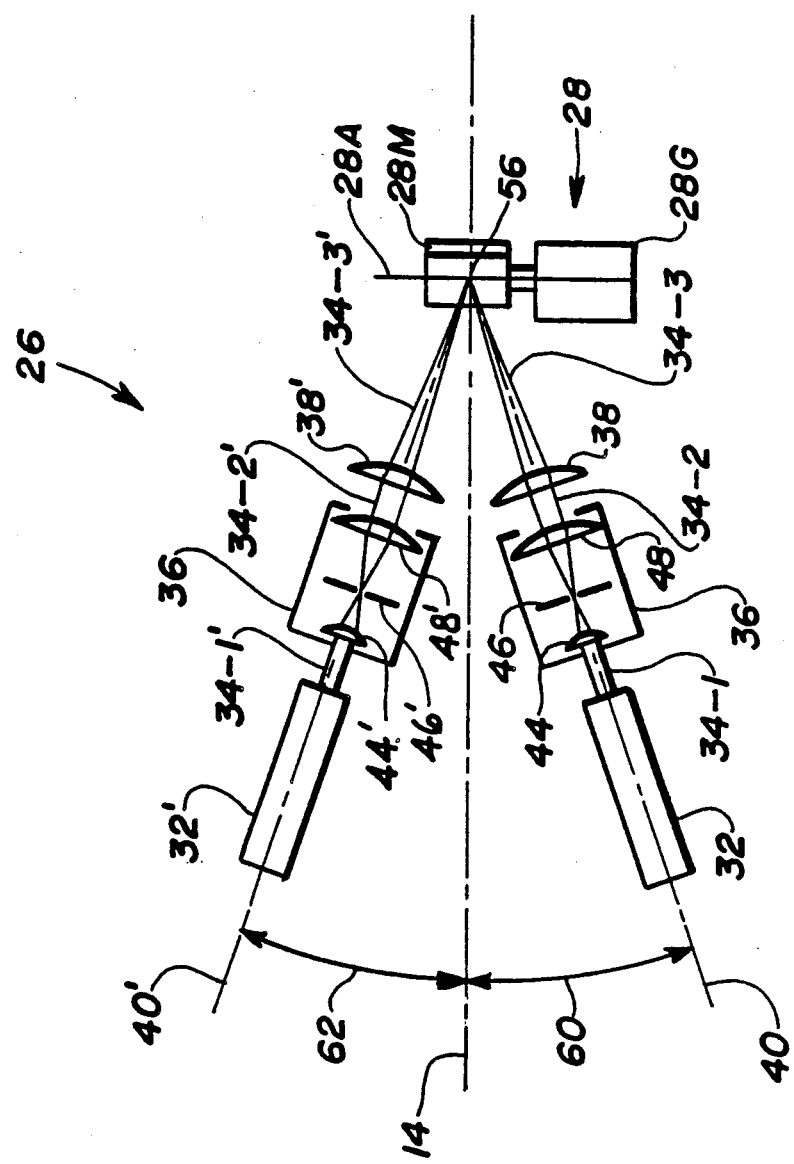
FIGS. 3A, 3B, 3C, and 3D are, respectively, a plan view, an input side elevational view of the input optical path, a front elevational view of the optical filter, and an output side elevational view of the optical correlator of the scanning beam optical processor shown in FIG. 2 taken along the appropriate view lines indicated thereon.
Figure 3A:
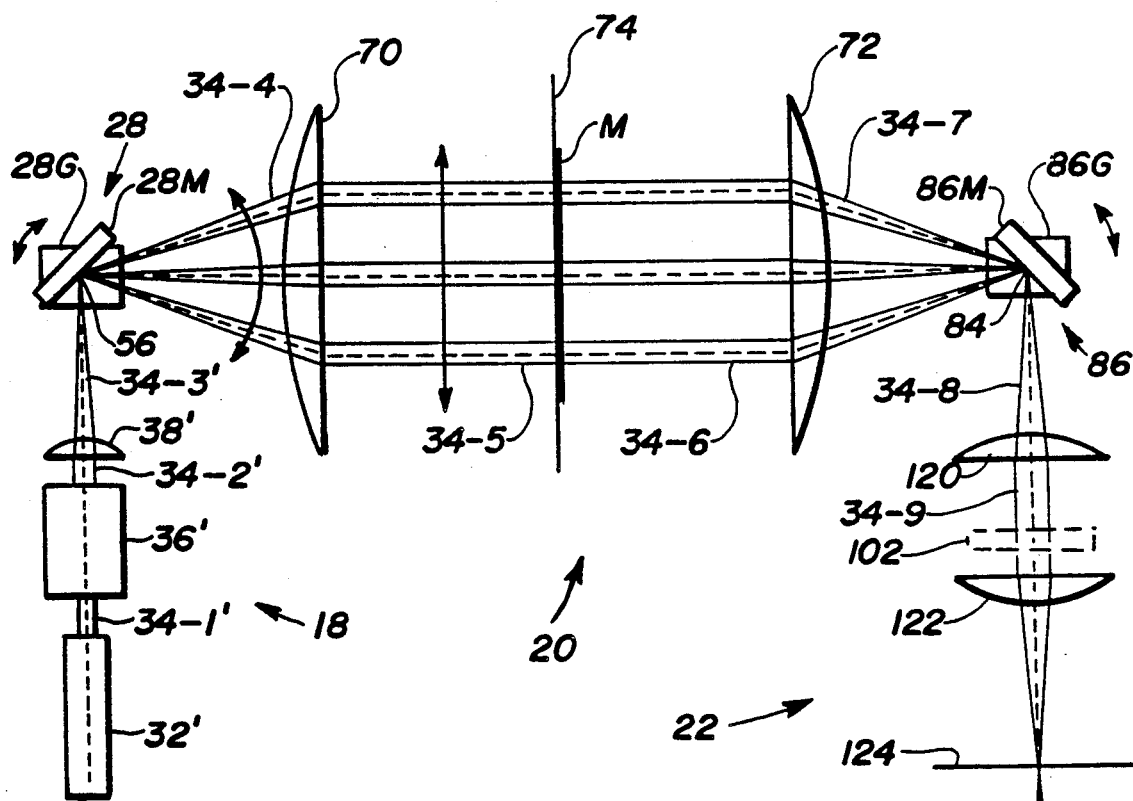
Figure 3C:
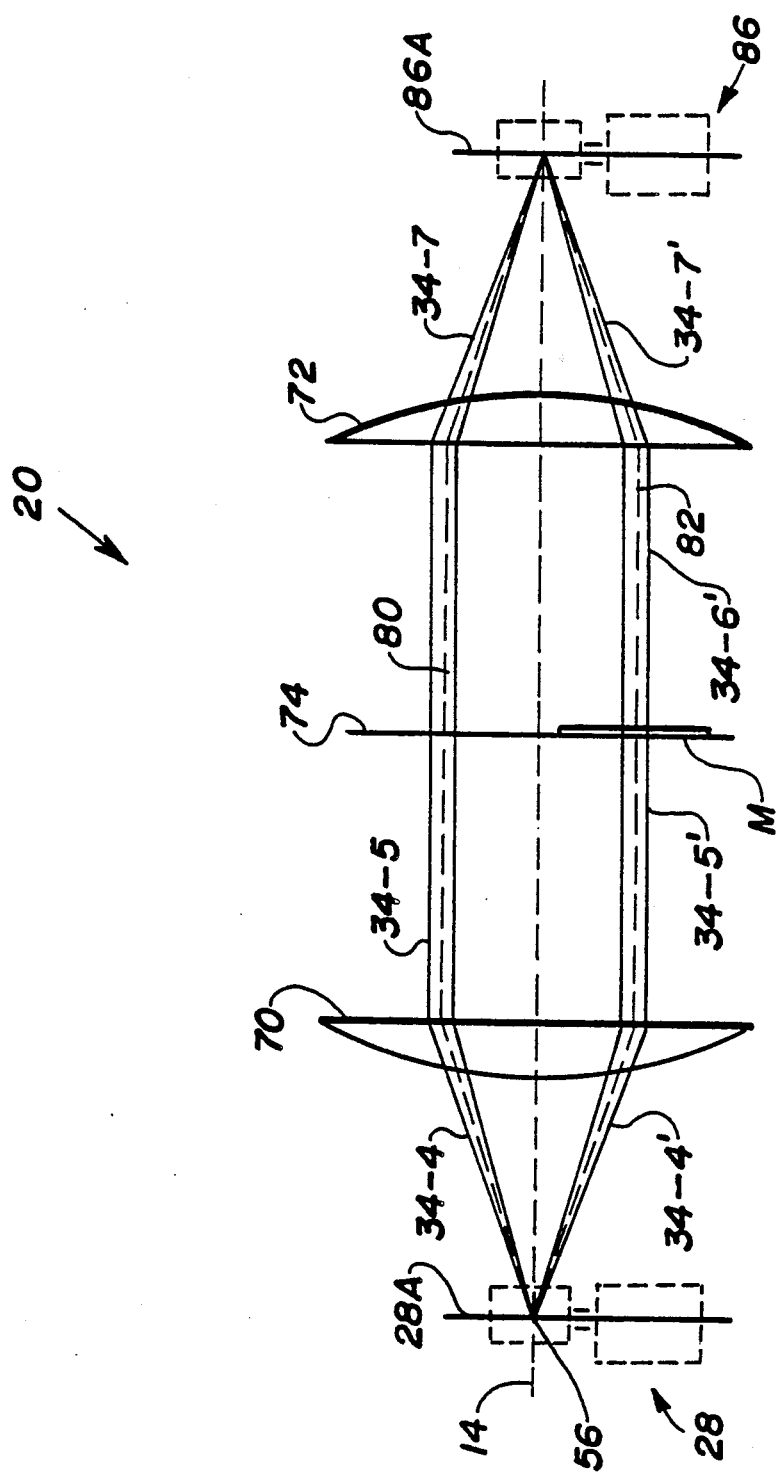

The input optical path 18 includes a positioning beam generator 24, an image information beam generator 26 and an input beam scanner, preferrably in the form of a scanning mirror assembly 28. The input scanning mirror assembly 28 is comprised of an input mirror 28M and a galvanometer motor 28G. Scanner driver module 30 provides the necessary drive current to the galvanometer motor 28G. The input mirror 28M is rotatable by the galvanometer motor 28G for oscillatory rotational motion about an axis 28A as best seen in FIGS. 3B and 3C. Suitable for use as the galvanometer assembly 28 is that available from General Scanning Corporation of Watertown, Mass. under model G100PD or G300PD. Suitable for use as the scanner driver module 30 is that available from General Scanning Corporation of Watertown, Mass. under model AX-200.

The scanning mirror assembly 28 and driver module 30 thus comprise means for moving the first mirror in a predetermined pattern about its axis to scan the beam of monochromatic light toward the collimating lens;

As best seen in FIG. 3B the positioning beam generator 24 comprises a laser 32 which produces a beam 34-1 of monochromatic light at a predetermined wavelength. Any laser in the visible, near ultraviolet or near infrared portion of the spectrum may be used. For example the laser 32 may be a helium-neon laser manufactured by Hughes Aircraft Corporation, Commercial Products Division, Carlesbad, Calif. and sold as model 3225H-PC. The beam 34-1 passes through a beam expander assembly 36 and a focussing lens 38. The laser 32, the beam expander assembly 36 and the focussing lens 38 are coaxially arranged along a first axis 40. The beam expander assembly 36 includes a converging lens 44, a spatial filter 46 and a collimating lens 48. These elements cooperate to produce an expanded collimated beam 34-2 which is focussed by the focussing lens 38 into a converging beam 34-3. The beam 34-3 converges to a focal point 56. The point 56 lies on input mirror 28M at the intersection of the rotational axis 28A and the reference plane 14.

Suitable for use as the beam expander 36 is that device available from the Newport Corporation of Fountain Valley, Calif. under Model 900 or Model 910. Based upon the desired focal length a suitable lens for use as the focusing lens 38 may be obtained by referring to the Laser Focussing Section of Catalog Number 4 of the Melles Griot Corporation of Rochester, N.Y.

The image information beam generator 26 is, in the preferred case, identical to the positioning beam generator 24. Accordingly, the image information beam generator 26 includes a laser 32' producing a monochromatic beam 34-1' (having the same predetermined wavelength as beam 34-1), a beam expander assembly 36' and a focussing lens 38'. These elements are coaxially arranged along a second axis 40'. The beam expander assembly 36' includes a converging lens 44', a spatial filter 46' and a collimating lens 48', all of which cooperate to produce an expanded collimated beam 34-2'. The beam 34-2' is focussed by the focussing lens 38' into a converging beam 34-3'. The beam 34-3' also converges to the focal point 56.

The elements comprising the positioning beam generator 24 and the image information beam generator 26 are symmetrically disposed in the plane defined by the axes 40 and 40' about the reference plane 14. Thus the angles 60 and 62, respectively defined between the axes 40 and 40' and the plane 14, are equal. The positioning beam generator 24 and the image information beam generator 26 thus each comprise means for producing a beam of monochromatic light focussed to the predetermined point on the first beam deflector.

Figure 3D:
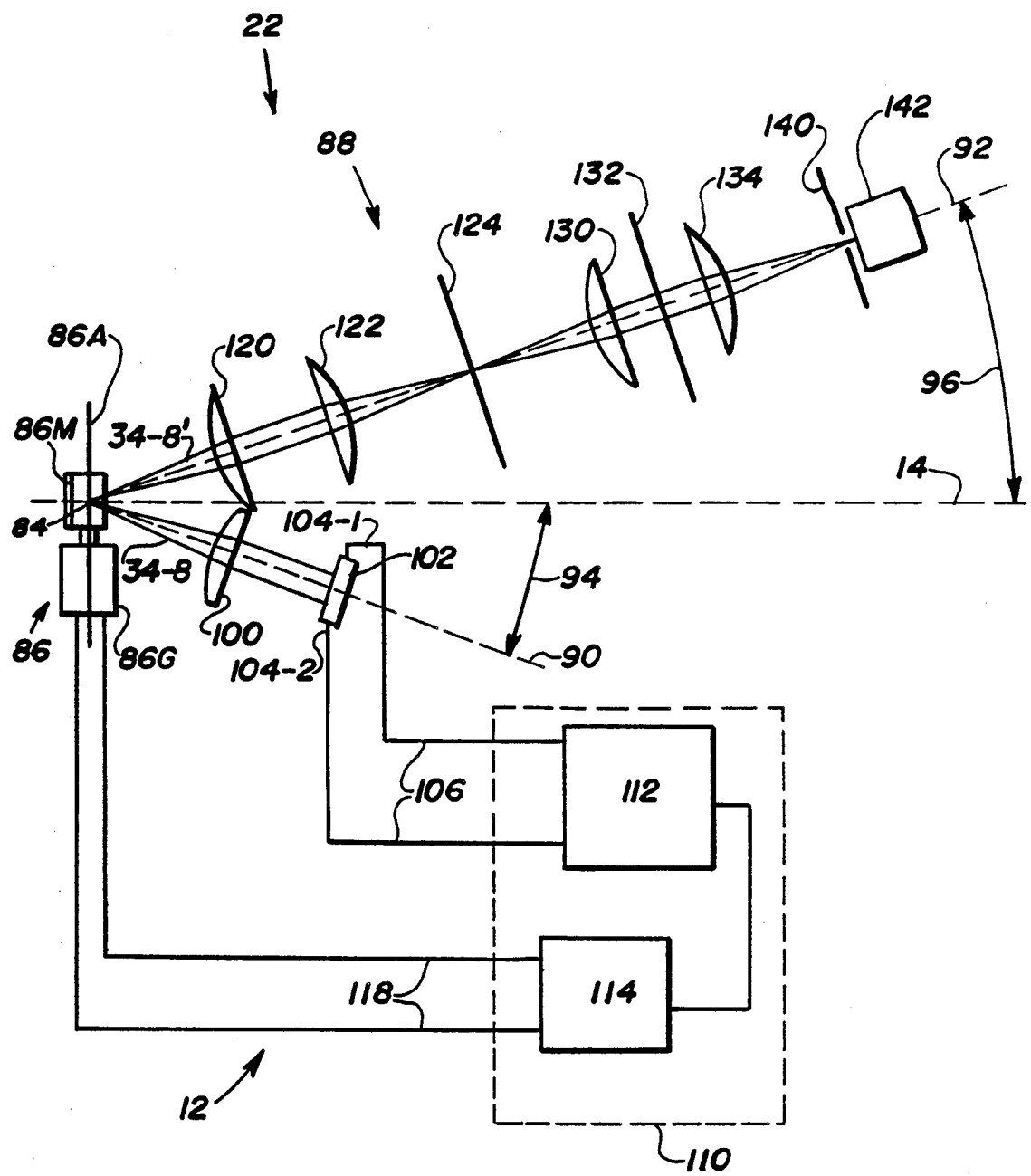
Figure 3E:
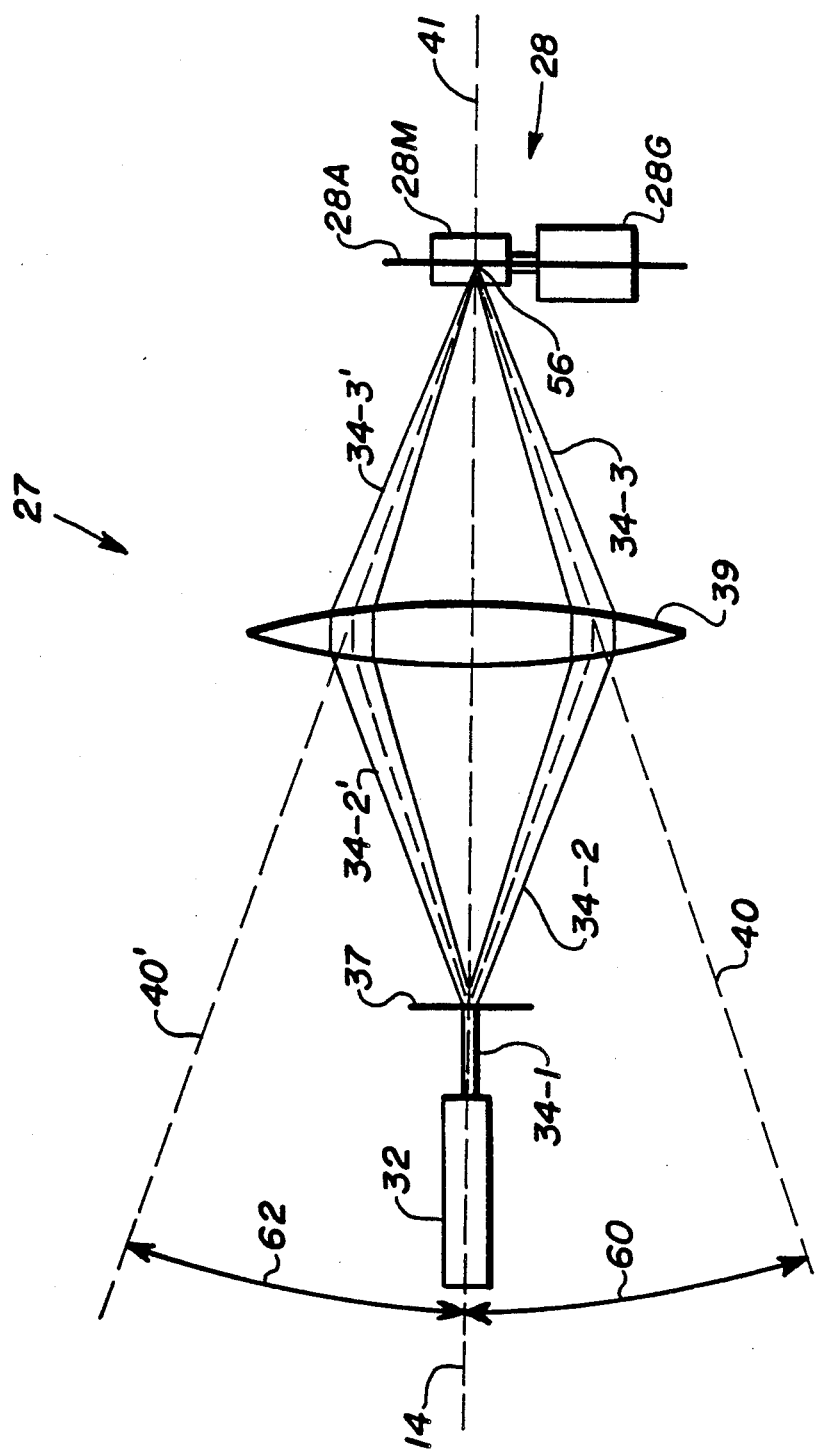
FIG. 3E is an input side elevational view of an alternate input optical path arrangement.

FIG. 3E illustrates an alternate arrangement of the input optical path 18 which includes a combined positioning and image information beam generator 27 and an input beam scanner preferably in the form of a scanning mirror assembly 28. The combined positioning and image information beam generator 27 comprises the laser 32 which produces the beam 34-1 of monochromatic light at a predetermined wavelength. The beam 34-1 passes through a holographic optical grating 37 and a focussing lens 39. The laser 32, the grating 37 and the focussing lens 39 are coaxially arranged along an axis 41 lying on plane 14. The grating 37 produces two diverging beams 34-2 and 34-2' which are focussed by the focussing lens 39 into converging beams 34-3 and 34-3'. The beams 34-3 and 34-3' converge to the focal point 56. The point 56 lies on input mirror 28M at the intersection of the rotational axis 28A and the reference plane 14.

A suitable holographic grating 37 may be fabricated in accordance with the paper by Streibl, N. and Jahns, J., "Techniques for Array Illumination", Proceedings of the OSA Topical Meeting on Optical Computing, Feb. 27- Mar. 1, 1989, Optical Society of America, pages 160–163.

As is believed best seen in FIG. 3C the Fourier optical filter 20 includes a collimating lens 70, a transform lens 72 and an input plane 74 located at a predetermined location intermediate between the lenses 70 and 72.

The rotation of the mirror 28M causes the beams 34-4 and 34-4' (diverging from the point 56) to scan about the axis 28A. The beams 34-4 and 34-4' are collimated by the collimating lens 70 into beams 34-5 and 34-5'. These beams sweep through the input plane 74 in respective planes 80 and 82. The planes 80 and 82 are parallel to and symmetrically disposed above and below the reference plane 14, as best seen in FIGS. 2 and 3C. The diameter of the collimated beams 34-5 and 34-5' may be adjusted by substituting for the lens 38 a lens having a different focal length. The diameter of the collimated beam may be adjusted by substituting for the lens 38' a lens having a different focal length.

A medium M to be scanned is placed in the input plane 74 so as to intersect the image information beam 34-5' that is being scanned in the plane 82. In situations where phase errors are of concern, such as when the medium M is a hologram, the plane 74 is preferably equidistant the lenses 70 and 72. If phase errors are not of importance then plane 74 need not be equidistant the lenses 70 and 72. The medium M is typically semitransparent and contains information in the form of an image. The medium M does not intersect the positioning beam 34-5. The light beam 34-6' emanating from the medium M is modulated thereby to impart thereto information representative of the optical characteristics of the medium M. The transform lens 72 receives the light in the positioning beam 34-5 and in the image information beam 34-6' and focusses the same into converging beams 34-7 and 34-7' to a focal point 84. The point 84 is defined on the surface of a descanning beam deflector assembly 86. The descanning beam deflector assembly 86 in the embodiment of FIGS. 2 and 3 takes the form of a descanning mirror assembly comprising a mirror 86M and a galvanometer motor 86G. The mirror 86M is rotatable by the galvanometer motor 86G for oscillatory rotational motion about an axis 86A.

The prior art literature concerning spatial filtering indicates that the lenses in a spatial filtering "optical computer" must be "well corrected" for the spatial filter to perform properly. All spherical lenses, however well corrected they may be, have some degree of spherical aberration present. This sperical aberration is minimal along the axis of the lens but can be quite severe near the outer edge of the lens. This sperical aberration is typically minimized by making the lens diameter much larger than the size of the image field. Even complicated multi-element lenses such as cited on page 600 of Jenkins, F. and White, H., *Fundamentals of Optics*, McGraw-Hill, 1976 are typically twice the diameter of the image field.

In accordance with the present invention the lenses 70 and 72 are hyperbolic lenses, so chosen to eliminate spherical aberration which would be particularly detrimental away from the central axis of each lens if conventional spherical lenses were used. At one specific optical wavelength hyperbolic lenses theoretically exactly match the geometry needed for the optical filter application. They have no spherical aberration at this design wavelength. See Kingslake, R., *Lens Design Fundamentals*, Academic Press, 1978, page 113. Modern numerical control fabrication techniques make it possible to readily manufacture large hyperbolic lenses from optical grade acrylic or ABS plastic. Hyperbolic plastic lenses, fabricated to the customer's specification, may be obtained from Applied Products, Inc., Horsham, Pa.

The descanning mirror assembly 86 forms part of the output optical path 22, which is best seen in FIG. 3D. The output optical path 22 includes the descanning beam deflector control system 12, and an optical correlator 88. The positioning beam 34-8 and the image information beam 34-8' emanating from the focal point 84 propagate into the descanning beam deflector control system 12 and the optical correlator 88, respectively.

In this embodiment of the invention the descanning beam deflector control system 12 takes the form of a descanning mirror position control system. The elements comprising the descanning beam deflector control system 12 are positioned along an axis 90 while the elements of the optical correlator 88 are arranged along an axis 92. The elements of the descanning beam deflector control system 12 and the elements of the optical correlator 88 are symmetrically disposed in the plane defined by the axes 90 and 92 about the reference plane 14. Thus, the angles 94 and 96, respectively defined between the axes 90 and 92 and the plane 14, are equal.

The descanning beam deflector control system 12 is operative in response to the positioning beam 34-8 to control the position of the mirror 86M so that it reflects the light in the image information beam 34-7' along the predetermined axis 92. The descanning beam deflector control system 12 is a servo system that optically detects the position of the beam 34-8 after it is reflected by the descanning mirror 86M and drives the galvanometer motor 86G to cause the image information beam 34-8' to remain stationary along the axis 92.

The descanning beam deflector control system 12 includes a collimating lens 100 and a position sensing photodetector 102. The positioning beam 34-8 passes through the collimating lens 100 and impinges on the detector 102. Suitable for use as the detector is the device manufactured by the Quantrad Corporation of Torrance, Calif. and sold as Model PS-100-50. The detector 102 has two outputs, 104-1 and 104-2, which provide signals proportional to the position of the positioning beam on the face of the detector 102. The position signals 104-1 and 104-2 are applied over a cable 106 to a beam deflector control module 110. The beam deflector control module 110 comprises a beam position amplifier circuit 112 and an output driver circuit 114. The beam deflector control module 110 generates beam deflector control signals, which when used with the embodiment of FIGS. 2 and 3, are applied on the lines 118 to drive the coils of the galvanometer motor 86G thereby to oscillate the descanning mirror 86M in a motion complementary to the motion of the scanning mirror 28M. Thus the position of the image information beam 34-8' reflected from the mirror 86M is maintained along the axis 92.

The optical correlator 88 includes a pair of relay lenses 120 and 122 followed, in series, by a spatial filter 124, a collimating lens 130, a correlation filter 132, a transform lens 134, a detector aperture 140 and a photodetector 142. The transmission function of the correlation filter 132 is in the form of an image. The optical correlator 88 serves to convolve the image information imparted to the image information beam 34' by the medium M with the information in the stored correlation function image. The image information beam 34-9' output from the optical correlator and incident on the photodetector 142 is proportional to the correlation between the two images. When the two images are identical the light incident on the photodetector reaches a maximum. The details of this correlation are set forth in Chapter 7 of Goodman, J. W., *Introduction to Fourier Optics*, McGraw-Hill, 1968, pages 171-177, which is hereby incorporated by reference. The photodetector 142 converts the incident light intensity in the image information beam 34-9' to an electrical signal which is transmitted, via a cable 148 to signal processing electronics 150 (FIG. 2).

The lenses 120, 122, 130 and 134 may also be hyperbolic if desired. Since, as will be discussed, the image information beam 34-8' remains centered on the axis 92, conventional spherical lenses of the requisite quality may be used. The photodetector 142 is typically a photomultiplier tube, such as that sold as Model C7164R by Burleigh Industries, Lancaster, Pa. or a PIN photodiode such as that sold by RCA as model 8310 series.

Figure 4:
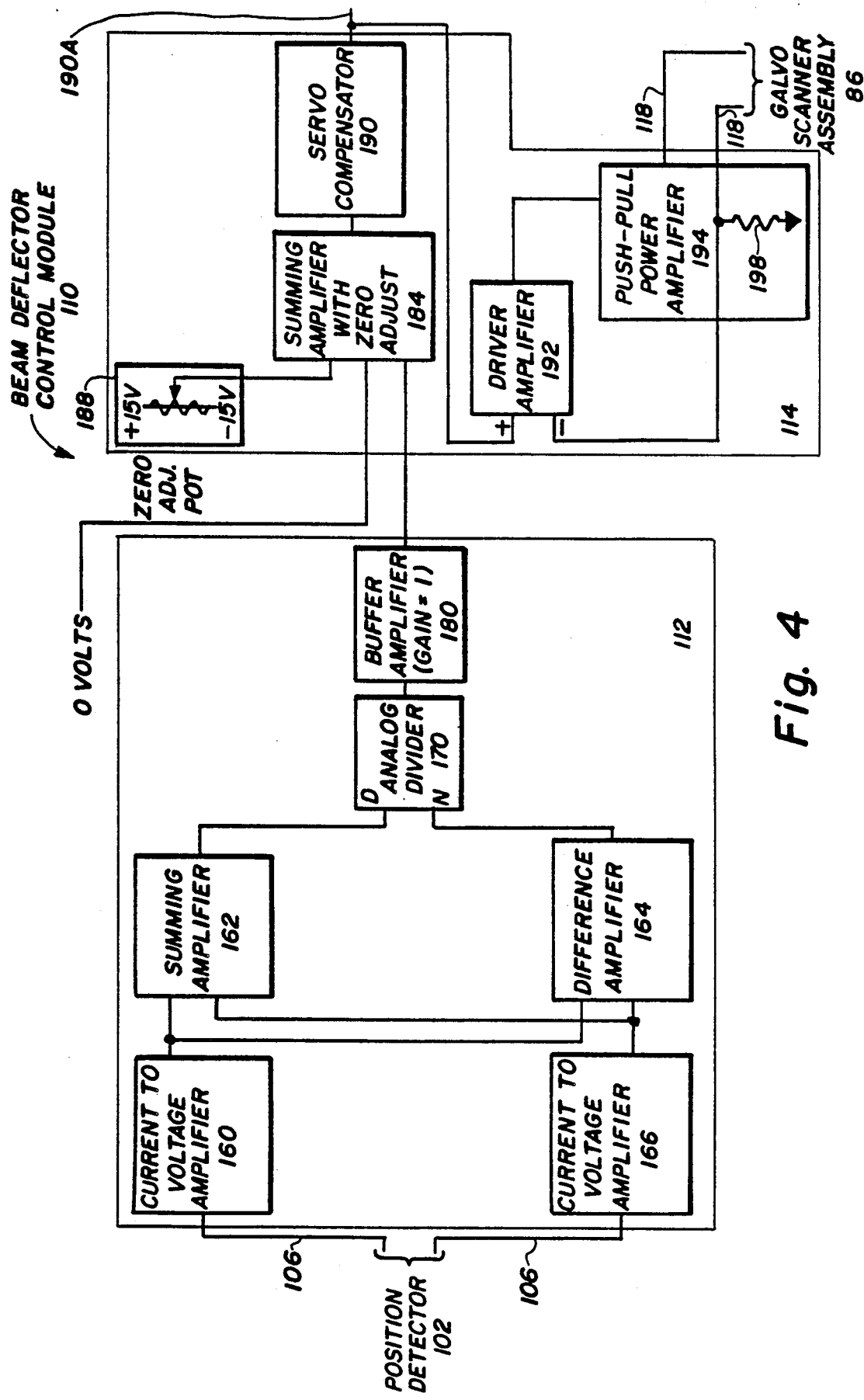
FIG. 4 is a block diagram of the descanning beam deflector control system in accordance with the present invention.

The detailed block diagram of the beam deflector control module 110 is shown in FIG. 4. The module 110 functions as a differential amplifier, and more specifically as a servo amplifier, for comparing the signal representative of the position of the deflected beam of light with a signal representative of the predetermined fixed reference axis and generates a beam deflector drive signal in response thereto.

The detector 102 is operated in a back biased current mode. The first output 104-1 of the detector 102 is applied to a current-to-voltage amplifier 160. The output of amplifier 160 is applied to a summing amplifier 162 and a difference amplifier 164. The other output 104-2 of the detector 102 is similarly applied to a second current-to-voltage amplifier 166. The output of the amplifier 166 is applied to the second input of the summing amplifier 162 and to the second input of the difference amplifier 164.

The outputs of the summing amplifier 162 and of the difference amplifier 164 are applied to the denominator (D) input and the numerator (N) input, respectively, of an analog divider 170, such as that sold by Burr-Brown, Phoenix, Arizona under model 4291. The output of the divider 170 is equal to N divided by D, multiplied by a ten (10), i.e., (N/D)×10. By dividing the difference signal by the summing signal, adverse effects of variations in the incident beam intensity on the detector 102 are eliminated or minimized.

The output of the divider 170 is applied to a buffer or non-inverting amplifier 180 having a gain of one (1). This output is fed to a summing amplifier 184. The other input to the summing amplifier 184 is typically held at zero potential with a zero adjustment potentiometer 188 for fine adjustment of the image information beam position.

The output of summing amplifier 184 is applied to a servo compensator 190. Preferably the compensator 190 is a lag-lead compensator similar to that described by D'Azzo and Houpis, *Feedback Control System Analysis and Synthesis*, pages 109-110, 1960. The compensator 190 ensures stability (i.e. prevents ringing and oscillation) by the beam deflector control module 110 and the position detector 102.

The output 190A of the compensator 190 drives one input of a driver amplifier 192 which in turn drives a push-pull amplifier 194. The push-pull amplifier 194 provides the drive current to coils in the galvanometer 86G via the cable 118. A feedback resistor 198 senses the actual current in the galvanometer coils and provides a negative feedback voltage to the driver amplifier 194.

Suitable for use as the amplifiers 160, 162, 164, 146, 180, 184, 192, 194 are those manufactured and sold by Burr-Brown as model number OPA11HT.

Figure 5:
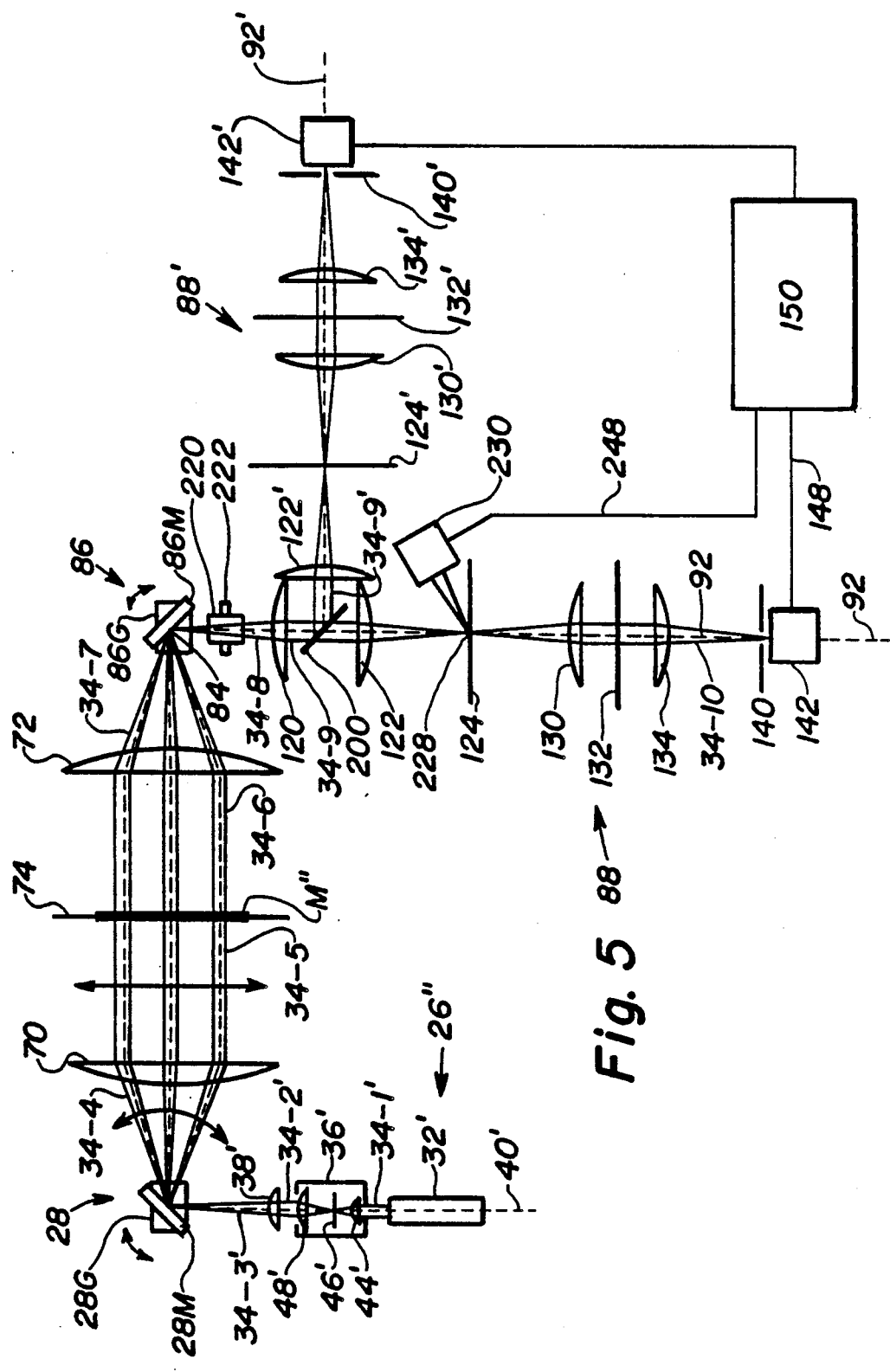
FIG. 5 is a plan view of an alternate implementation of an optical correlator which may be used in the optical processor shown in FIGS. 2 through 4 in which multiple optical correlators are utilized.

Referring now to FIG. 5, an alternate embodiment of the invention, employing multiple Fourier optical correlators is shown. For clarity the beam position detecting optical components are not shown. A second optical correlator 88' may be implemented as shown, but it should be understood that additional correlators may be implemented. A beam splitter 200 is positioned to reflect part 34-9' of the light beam 34-9 through a relay lens 122', a spatial filter 124', a collimating lens 130', a correlation filter 132', a transform lens 134', a detector aperture 140' to a photodetector 142'. The electrical signal from photodetector 142' is transmitted, via a cable 148', to processing electronics 150. The transfer functions of the spatial filter 124' and the correlation filter 132' would typically be different from the filters 124 and 132 respectively. An optional image rotator, such as a dove prism 220 is mounted in a rotatable mount 222. The dove prism 220 serves to rotate the reflected image about the axis 92 as an adjustment aid for alignment with optical correlator 88.

An optional photodetector 230, which serves as a zero-order detector, may be positioned as shown. A small mirror 228, typically of several millimeters diameter is positioned at the center of spatial filter 124 and inclined at a suitable angle to reflect that portion of light beam 34-9' lying directly along axis 92. The photodetector 230 converts the undiffracted light, the so called zero-order diffraction pattern, of the incident light intensity in the image information beam 34-9' to an electrical signal which is transmitted, via a cable 248 to signal processing electronics 150.

In the foregoing description the optical processor 10 is implemented as a two-beam device in that both a positioning beam 34 and an image information beam 34' are generated and operated upon. Such an arrangement is preferred because the positioning beam is not modulated by the medium M and thus provides more precise control over the descanning mirror than do the alternate embodiments to be discussed. As previously discussed in connection with FIG. 3E, these two beams 34 and 34' could be derived from a single laser source if desired.

However, it should be understood that adequate control of the descanning beam deflector can be obtained if the positioning signal is derived from the image information beam. Such alternate embodiments are shown in FIGS. 6 through 9.

Figure 6:
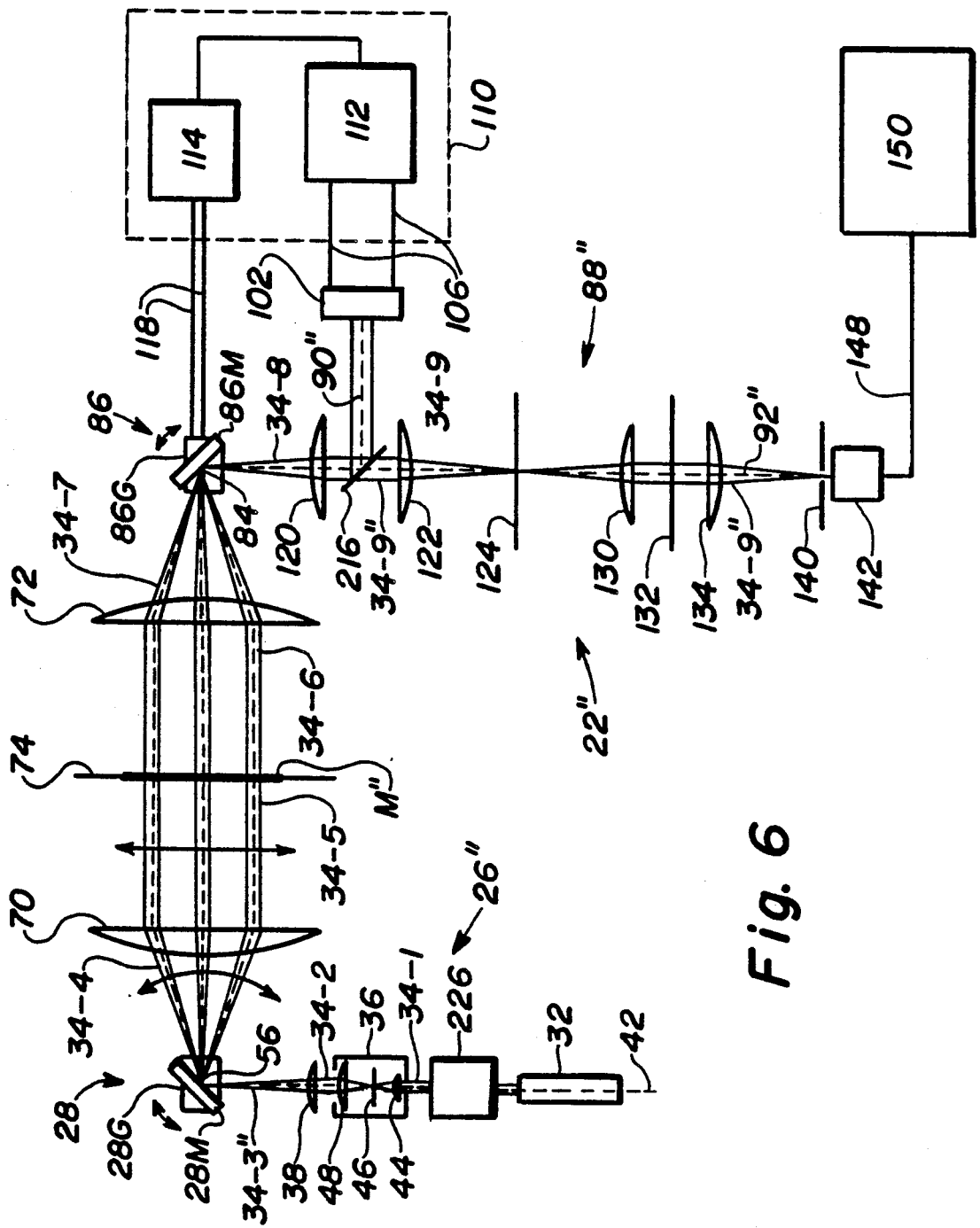
FIG. 6 is a plan view of a scanning beam optical processor having an alternate embodiment of a descanning beam deflector control system in accordance with the present invention in which the positioning signal is derived from the image information beam.
Figure 6A:
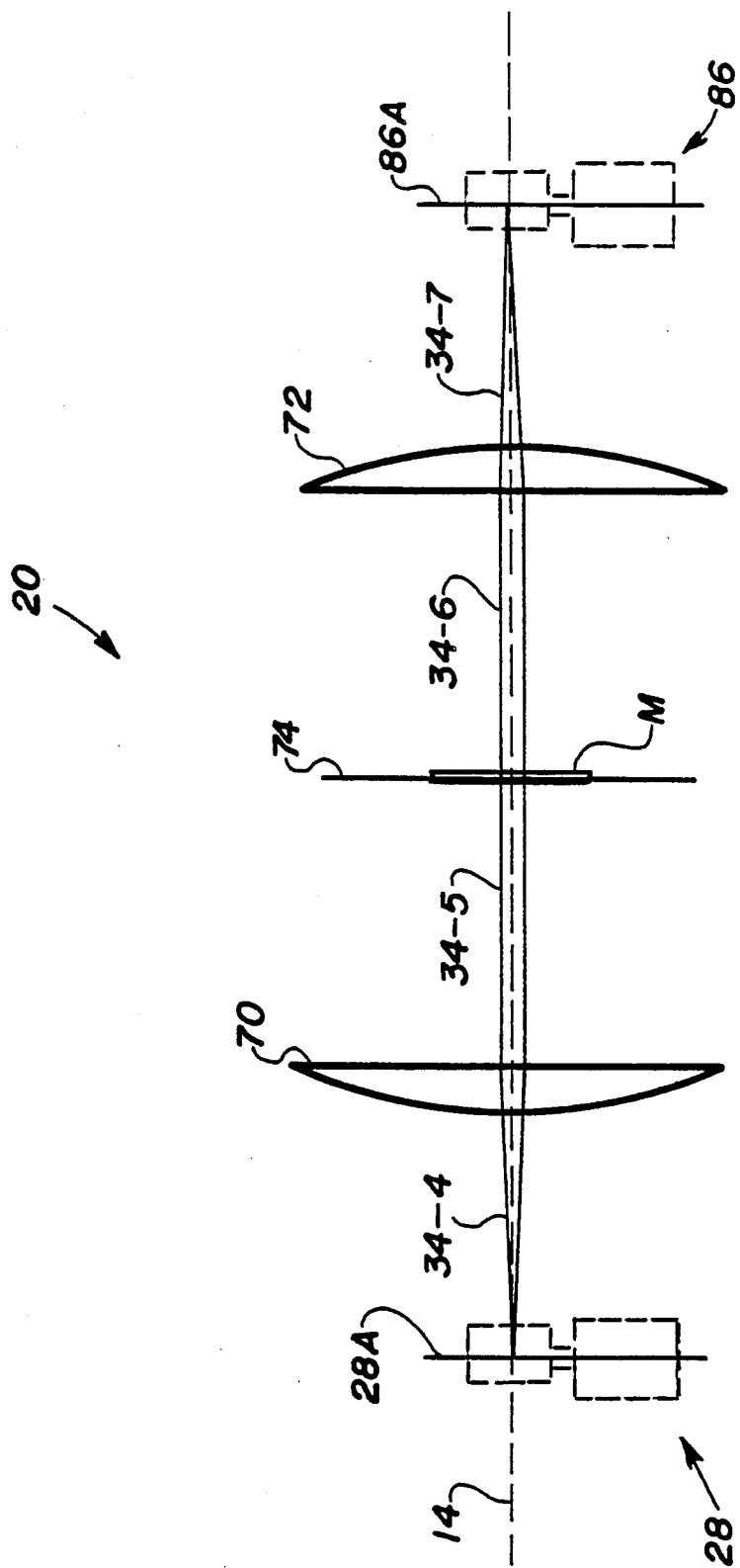
FIG. 6A is a front elevational view of the optical filter used in the alternate embodiment of the beam deflector control system of FIG. 6.

FIG. 6 illustrates an alternate embodiment of the present invention, in which a single light beam is used. In this embodiment the positioning signal is derived from the image information beam. All optical elements are disposed on the reference plane 14. FIG. 6A, which corresponds with FIG. 3C of the earlier embodiment, illustrates a front elevational view of the optical filter 20.

The input optical path 18" includes a single beam generator 26" and an input scanning beam deflector, again preferably in the form of a mirro assembly 28, previously discussed.

The beam generator 26" comprises a laser 32 which produces a beam 34-1 of monochromatic light at a predetermined wavelength. The beam 34-1 passes through an optional optical encoding assembly 226, to be described in connection with FIGS. 7 and 8, then through beam expander assembly 36 and a focussing lens 38. The laser 32, the optical assembly 226, the beam expander assembly 36 and the focussing lens 38 are coaxially arranged along an axis 42. The beam expander assembly 36 includes a converging lens 44, a spatial filter 46 and a collimating lens 48. These elements cooperate to produce an expanded collimated beam 34-2 which is focussed by the focussing lens 38 into a converging beam 34-3. The beam 34-3 converges to a focal point 56. The point 56 lies on input mirror 28M at the intersection of the rotational axis 28A and the reference plane 14.

As seen in FIG. 6A the Fourier optical filter 20 includes a collimating lens 70, a transform lens 72 and an input plane 74 located at a predetermined location intermediate between the lenses 70 and 72. In situations where phase errors are of concern, such as when the medium M is a hologram the plane 74 is preferably equidistant the lenses 70 and 72. If phase errors are not of importance then plane 74 need not be equidistant the lenses 70 and 72.

The rotation of the mirror 28M causes beam 34-4 (diverging from the point 56) to scan about the axis 28A. The beam 34-4 is collimated by the collimating lens 70 into beam 34-5. This beam sweeps through the input plane 74 in reference plane 14. The diameter of the collimated beam 34-5 may be adjusted by substituting for the lens 38 a lens having a different focal length.

A medium M" to be scanned is placed in the input plane 74 so as to intersect the beam 34-5 that is being scanned in the plane 14. The medium M" is typically semitransparent and contains information in the form of an image. The light beam 34-6 emanating from the medium M" has been modulated thereby to impart thereto information representative of the optical characteristics of the medium M". The transform lens 72 receives the light in the modulated beam 34-6 and focusses the same into converging beam 34-7 to a focal point 84. The point 84 is defined on the surface of a descanning beam deflector assembly 86. The descanning beam deflector, again in the form of a mirror assembly 86, includes a mirror 86M and a galvanometer motor 86G. The mirror 86M is rotatable by the galvanometer motor 86G for oscillatory rotational motion about an axis 86A.

In accordance with the present invention the lenses 70 and 72 are hyperbolic lenses, so chosen to eliminate spherical aberration as previously discussed.

The descanning beam deflector assembly 86 forms part of the output optical path 22". The output optical path 22" includes the descanning beam deflector control system 12 and an optical correlator 88". Beam splitter 216 divides portions of the beam 34-8, emanating from the focal point 84, to propagate into the descanning beam deflector control system 12 (beam 34-9) and the optical correlator 88" (beam 34-9"), respectively.

The elements comprising the descanning beam deflector control system 12 are positioned along an axis 90" while the elements of the optical correlator 88" are arranged along an axis 92".

The descanning beam deflector control system 12 is operative in response to the positioning portion 34-9 of beam 34-8 to control the position of the mirror 86M so that it reflects the light in the image information beam portion 34-9" along the predetermined axis 92". The descanning beam deflector control system 12 is a servo system that optically detects or senses the position of the beam 34-9 after it is reflected by the descanning mirror 86M and drives the galvanometer motor 86G to cause the image information beam 34-9" to remain stationary along the axis 92".

The descanning beam deflector control system includes a beam splitter 216 and a position sensing photodetector 102. The portion 34-9 of beam 34-8 is directed by beam splitter 216 to the detector 102, previously discussed. The detector 102 generates signals representative of the position of the positioning beam 34-9. The detector outputs 104-1 and 104-2, which provide signals proportional to the position of the positioning beam 34-9 on the face of the detector 102 are applied over a cable 106 to the beam deflector control module 110, previously discussed in connection with FIG. 3. The beam deflector control module 110 generates beam deflector control signals, which are applied on the lines 118 to drive the coils of the galvanometer motor 86G thereby to oscillate the descanning mirror 86M mirror in a motion complementary to the motion of the scanning mirror 28M. Thus the position of of beam 34-9 is kept aligned with a predetermined axis 90", thus maintaining image information beam 34-9" aligned with an axis 92".

The optical correlator 88" includes components as discussed previously for optical correlator 88. The photodetector 142 converts the incident light intensity in the image information beam 34-9" to an electrical signal which is transmitted, via a cable 148 to signal processing electronics 150.

Figure 7:
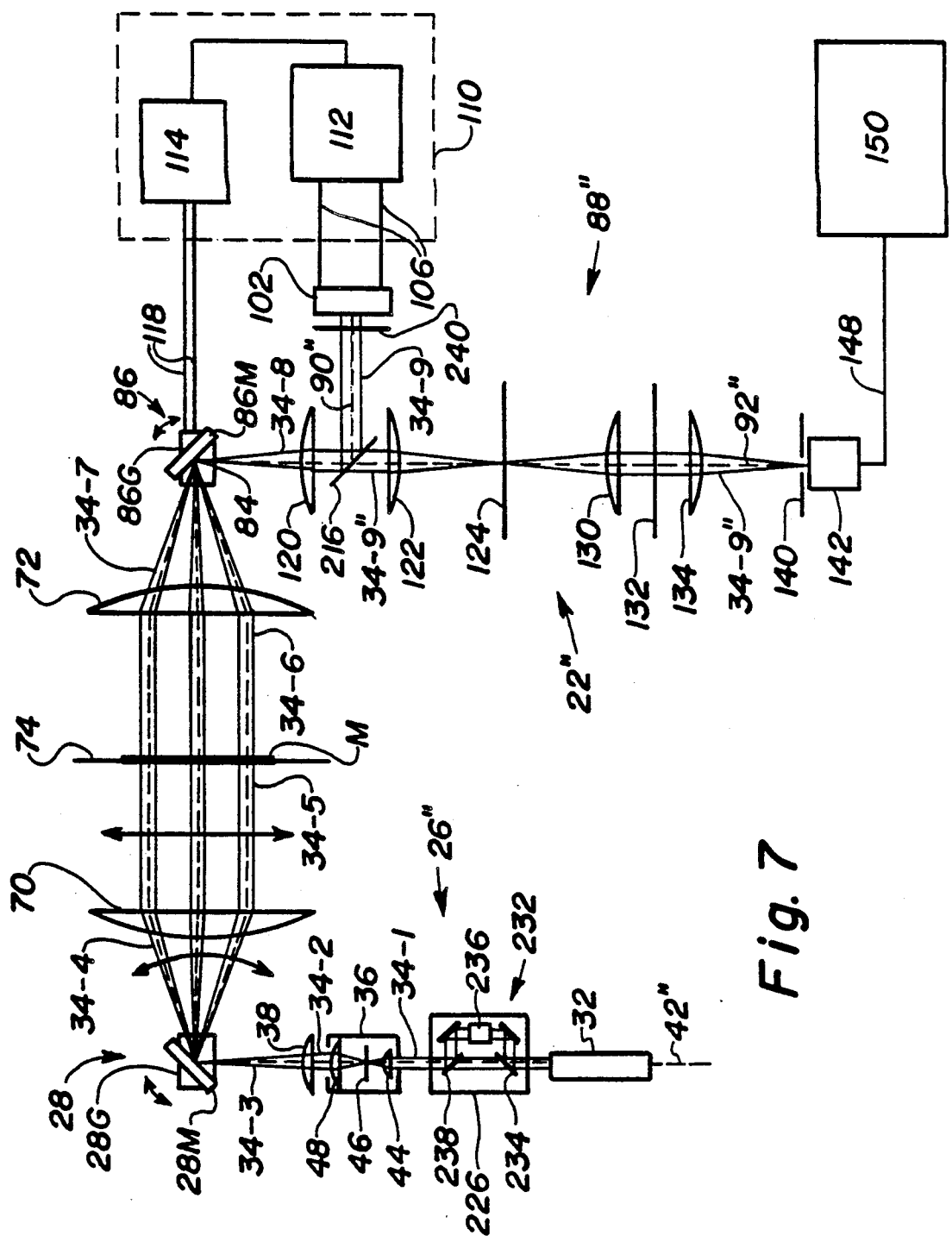
FIGS. 7 and 8 are alternate embodiments of an optical beam encoding arrangement for improving the signal to noise ratio of the beam positioning signal derived as shown in FIG. 6.

FIG. 7 illustrates a first polarization encoding embodiment of the optical encoding assembly 226 of the present invention. This polarization encoding configuration requires that laser 32 be linearly polarized. Polarization optics 232 produce a beam 34-1, having two orthogonally polarized components 34-1A and 34-1B. Beam splitter 234 splits the beam from the laser into two substantially equal portions. The polarization rotor element 236 rotates the polarization vector of component 34-1B by ninety (90) degrees from the polarization vector of component 34-1A. Beam combiner 238 coaxially combines the two components 34-1A and 34-1B. A polarization filter 240 placed in front of position detector 102 is used to selectively detect the position of beam 34-9 having the rotated polarization. Alternately, beam splitter 216 could be a polarization sensitive beam splitter.

Figure 8:
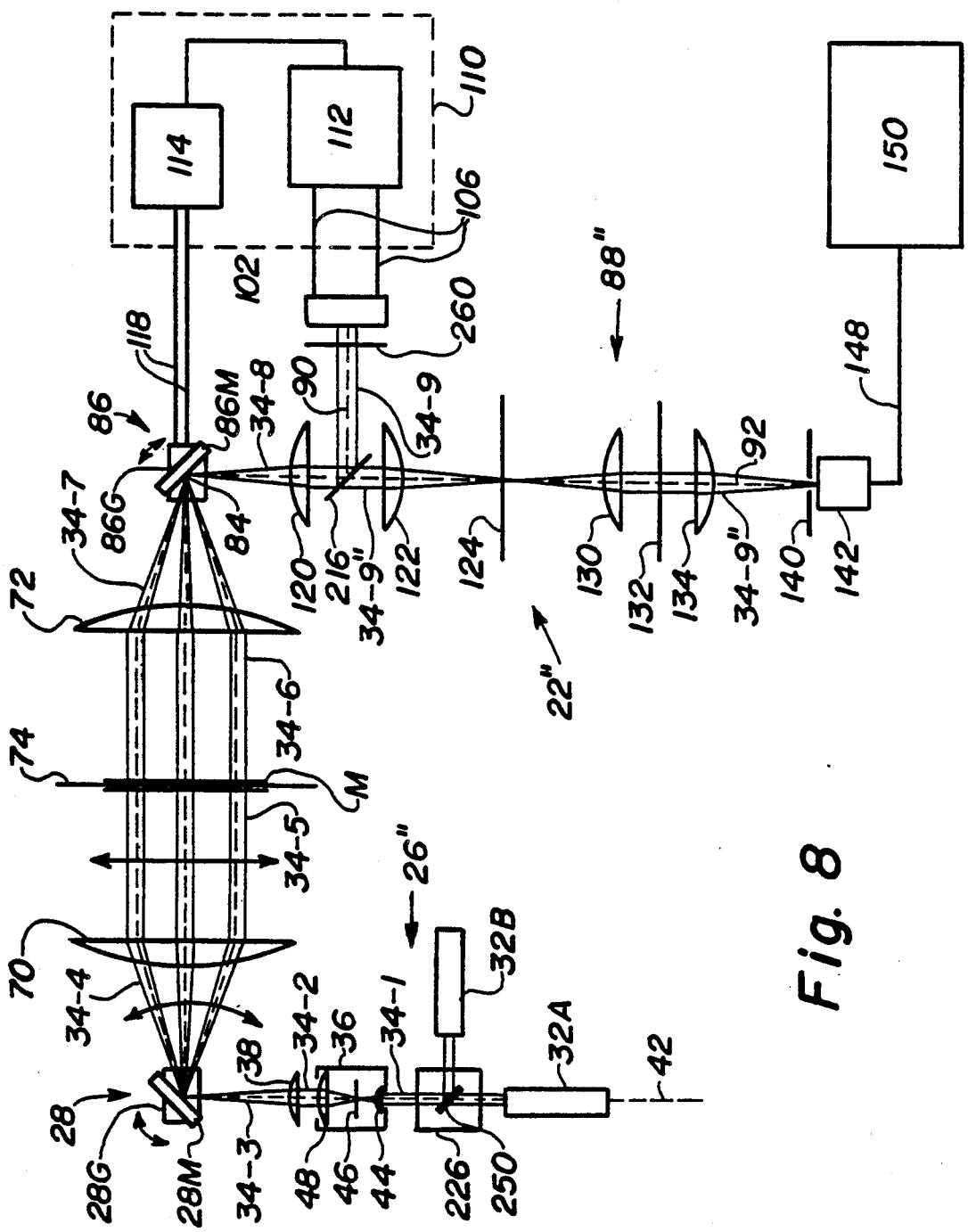

FIG. 8 illustrates a second wavelength encoding embodiment of the optical encoding assembly 226 of the present invention. This wavelength encoding configuration utilizes two lasers 32C and 32D, each having different wavelengths, with beam combining optics 250 to produce a beam 34-1, having two coaxial components 34-1C, having a first wavelength and 34-1D having a second wavelength. Beam combiner 252 coaxially combines beams from the two lasers 32A and 32B. A wavelength bandpass filter 260 placed in front of position detector 102 is used to selectively detect the position of the beam 34-9 having the second wavelength. Alternately, beam splitter 216 could be a wavelength sensitive beam splitter that passes the first wavelength and reflects the second wavelength thus making filter 260 unnecessary. It is recognized that the wavelengths of lasers 32C and 32D should minimally separated to minimize chromatic aberration of hyperbolic lenses 70 and 72, but be sufficiently different to permit adequate separation by bandpass filter 260 or wavelength sensitive beam splitter 216.

Figure 9:
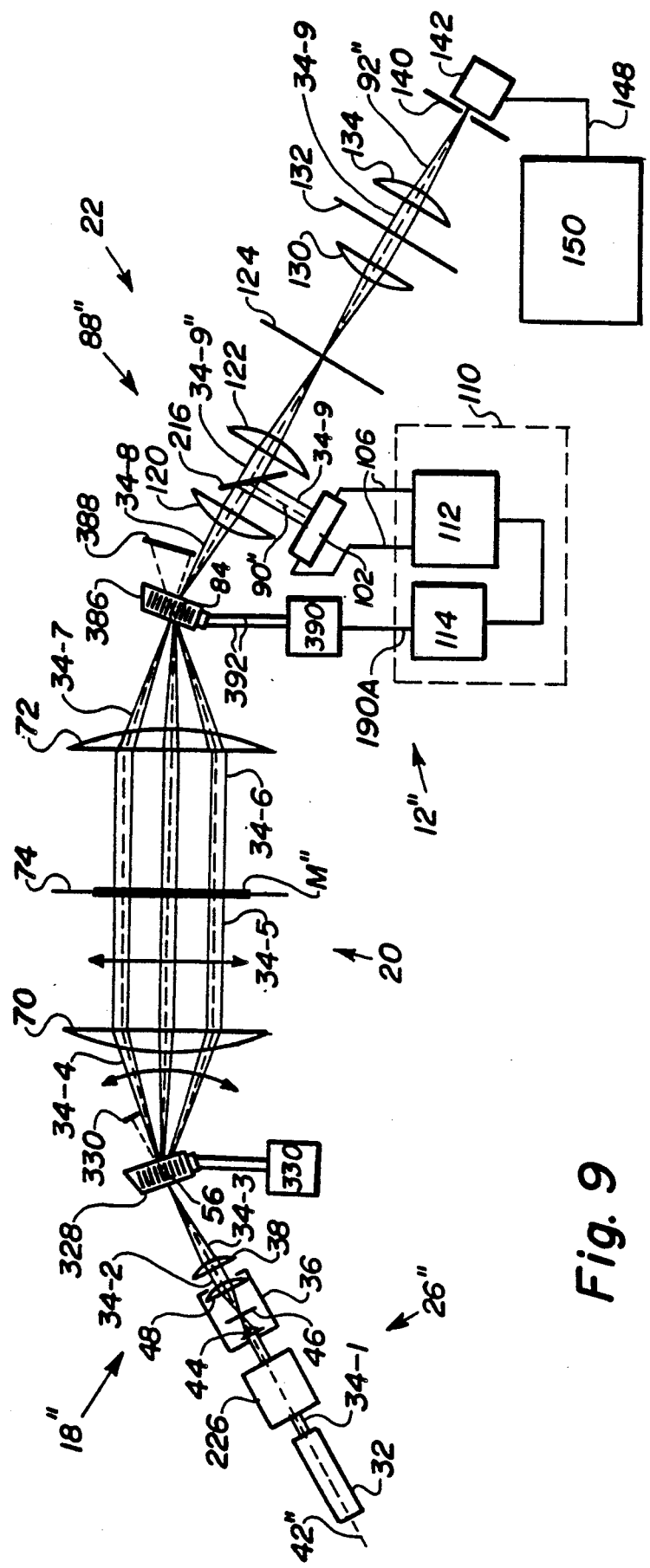
FIG. 9 is a plan view of a scanning beam optical processor having an alternate embodiment of a descanning beam deflector control system in accordance with the present invention in which an acousto-optic beam deflector is employed instead of a rotatable mirror and in which the beam positioning signal is derived from the image information beam.

FIG. 9 illustrates an alternate embodiment of the present invention, in which a single light beam is used, and in which the beam deflectors take the form of acousto-optic devices. Thus acousto-optic beam deflectors 328 and 386 are substituted for rotatable mirror assemblies 28 and 86, respectively. In this figure the angles of beam deflection have been exaggerated for clarity of illustration. Acousto-optic beam deflector 328 scans the beam in response to an acousto-optic driver module 330.

In this embodiment the positioning signal is derived from the image information beam and the beam deflector control system operates in a manner similar to that previously discussed for FIG. 6. All optical elements are disposed on the reference plane 14. This embodiment offers the advantage of increased scanning speed but does not achieve the same level of optical efficiency due to the losses in the acousto-optical beam deflectors. The acousto-optic beam deflector 328, which performs the scanning function, produces a first order diffracted beam whose angle of diffraction depends upon the frequency of the acoustic wave from acousto-optic driver module 330. The beam stop 330 blocks the undiffracted beam. The acousto-optic beam deflector 328 and the acousto-optic driver module 330 thus cooperate to comprise means for driving the first beam deflector to scan the beam of monochromatic light in a predetermined pattern toward the collimating lens.

Similarly, the acousto-optic beam deflector 386, which performs the descanning function, produces a first order diffracted beam whose angle of diffraction depends upon the frequency of the acoustic wave. The beam stop 388 blocks the undiffracted beam. In this embodiment the output 190A from beam deflector control module 110 provides the necessary input signal directly to the acousto-optic driver module 390. Driver amplifier 192 and push-pull amplifier 194 are not used in this embodiment. The beam deflector control module 110, the acousto-optic driver module 390, and the acousto-optic beam deflector 386 thus cooperate to comprise a controller for controlling the position of a beam of light deflected from the point on the second beam deflector to maintain the same on the predetermined fixed reference axis.

The book by Gottlieb, Ireland and Day, *Electro-Optic and Acousto-Optic Scanning and Deflection*, Marcel Dekker, 1983, pages 158–175 discusses acousto-optic scanning in detail and is hereby incorporated by reference.

Those skilled in the art, having the benefit of the teachings of the present invention, may effect numerous modifications thereto. It should be understood that such modifications are to be construed as lying within the contemplation of the present invention, as defined by the appended claims.

What is claimed is:

1. In combination with an optical system comprising:
a beam deflector for deflecting a beam of light about a predetermined axis in response to a beam deflector drive signal, and
focussing means for causing a beam of light impinging on the focussing means to be focussed to a point on the beam deflector and to be incident on that point at a varying angle lying within a predetermined range, the point lying on the axis,
a controller for controlling the beam deflector to cause a beam of light deflected therefrom to propagate along a predetermined fixed reference axis, the controller comprising:
a detector for sensing a portion of the beam deflected from the point on the beam deflector and for generating a signal representative of the position thereof; and
a differential amplifier for comparing the signal representative of the position of the deflected beam of light with a signal representative of the predetermined fixed reference axis for generating the beam deflector drive signal in response thereto.

2. The optical system of claim 1, further comprising:
a beam splitter for splitting the beam of light deflected from the beam deflector into a first and a second portion and for directing the first portion toward the detector.

3. The optical system of claim 2, wherein the first portion of the deflected beam of light contains position information and the second portion of the deflected light contains image information.

4. The optical system of claim 3, further comprising a Fourier optical correlator, and wherein the second portion of the deflected beam of light is directed by the beam splitter toward the Fourier optical correlator.

5. The optical system of claim 1, wherein the beam deflector comprises an acousto-optical device.

6. The optical system of claim 1, wherein the beam deflector comprises a rotatable mirror having a reflecting surface thereon, the axis lying on the reflecting surface.

7. The optical system of claim 6, wherein the beam of light impinging on the beam deflector comprises a first portion having position information and a second portion having image information.

8. The optical system of claim 7, wherein the differential amplifier of the controller is a servo amplifier.

9. The optical system of claim 6, wherein the differential amplifier of the controller is a servo amplifier.

10. In combination with an optical system comprising:
a rotatable mirror having a reflecting surface thereon, the mirror being rotatable about a predetermined axis in response to a mirror drive signal, the axis lying on the reflecting surface, and
focussing means for causing a beam of light impinging on the focussing means to be focussed to a point on the mirror and to be incident on that point at a varying angle lying within a predetermined range, the point lying on the axis,
a controller for controlling the position of the mirror to cause a beam of light reflected therefrom to propagate along a predetermined fixed reference axis, the controller comprising:
a detector for sensing a portion of the beam reflected from the point on the mirror and for generating a signal representative of the position thereof; and
a differential amplifier for comparing the signal representative of the position of the reflected beam of light with a signal representative of the predetermined fixed reference axis for generating the mirror drive signal in response thereto.

11. The optical system of claim 10, further comprising:
a beam splitter for splitting the beam of light reflected from the point on the mirror into a first and a second portion and for directing the first portion toward the detector.

12. The optical system of claim 11, wherein the first portion of the reflected beam of light contains position information and the second portion of the reflected light contains image information.

13. The optical system of claim 12, further comprising a Fourier optical correlator, and wherein the second portion of the reflected beam of light is directed by the beam splitter toward the Fourier optical correlator.

14. The optical system of claim 10, wherein the beam of light impinging on the mirror comprises a first portion having position information and a second portion having image information.

15. The optical system of claim 10, wherein the differential amplifier of the controller is a servo amplifier.

16. In combination with an optical system comprising:
a rotatable mirror having a reflecting surface thereon, the mirror being rotatable about a predetermined axis in response to a mirror drive signal, the axis lying on the reflecting surface, and
focussing means for causing a first and second beam of light impinging on the focussing means to be both focussed to a point on the mirror so that each is incident on that point at a varying angle lying within a predetermined range, the point lying on the axis,
a controller for controlling the position of the mirror to cause the first and the second beams of light, to be reflected from the mirror to propagate along respective first and second predetermined fixed reference axes, the controller comprising:
a detector for sensing the first beam reflected from the point on the mirror and for generating a signal representative of the position thereof; and
a differential amplifier for comparing the signal representative of the position of the first beam with a signal representative of the first predetermined fixed reference axis for generating the mirror drive signal.

17. The optical system of claim 16, wherein the first beam of the reflected light contains position information and the second beam of the reflected light contains image information.

18. The optical system of claim 17, further comprising a Fourier optical correlator, the correlator being disposed on the second reference axis, and wherein the second beam of the reflected light contains image information, the second beam of reflected light being directed toward the Fourier optical correlator.

19. The optical system of claim 16, wherein the differential amplifier of the controller is a servo amplifier.

20. A scanning beam Fourier optical processor comprising:
a first beam deflector for deflecting a beam of light about a predetermined axis in response to a first beam deflector drive signal, and
a second beam deflector for deflecting a beam of light about a predetermined axis in response to a second beam deflector drive signal, and
means for producing a beam of monochromatic light focussed to the predetermined point on the first beam deflector;
a Fourier optical filter disposed between the first and the second beam deflectors, the Fourier optical filter comprising a collimating lens, a medium having an image thereon, and a transform lens,
the collimating lens collimating light incident thereon and directing the same toward the medium so as to pass therethrough at a nonvarying angle of incidence, the transform lens focussing light transmitted through the medium to a predetermined point on the second beam deflector;
a Fourier optical correlator disposed on a predetermined fixed reference axis that passes through the predetermined point on the second beam deflector;
means for driving the first beam deflector to scan the beam of monochromatic light in a predetermined pattern toward the collimating lens;
a controller for controlling the position of a beam of light deflected from the point on the second beam deflector to maintain the same on the predetermined fixed reference axis, the controller comprising:
a detector for sensing a portion of the beam deflected from the point on the second beam deflector and for generating a signal representative of the position thereof; and
a differential amplifier for comparing the signal representative of the position of the light with a signal representative of the predetermined fixed reference axis for generating a drive signal for the second beam deflector.

21. The optical processor of claim 20, further comprising:
a beam splitter for splitting the light deflected from the point on the second beam deflector into a first and a second portion and for directing the first portion toward the detector.

22. The optical processor of claim 21, wherein the first portion of the deflected light contains position information and the second portion of the deflected light contains image information derived from the medium.

23. The optical processor of claim 20, wherein the first beam deflector comprises an acousto-optical device.

24. The optical processor of claim 23, wherein the second beam deflector comprises an acousto-optical device.

25. The optical processor of claim 23, wherein the second beam deflector comprises a rotatable mirror having a reflecting surface thereon, the axis lying on the reflecting surface.

26. The optical processor of claim 20, wherein the second beam deflector comprises an acousto-optical device.

27. The optical processor of claim 20, wherein the first beam deflector comprises a rotatable mirror having a reflecting surface thereon, the axis lying on the reflecting surface.

28. The optical processor of claim 20, wherein the second beam deflector comprises a rotatable mirror having a reflecting surface thereon, the axis lying on the reflecting surface.

29. The optical processor of claim 20, wherein the first and the second beam deflectors each comprise an acousto-optical device.

30. The optical processor of claim 20, wherein the first and the second beam deflectors each comprise a rotatable mirror having a reflecting surface thereon, the axis lying on the reflecting surface.

31. The optical processor of claim 30, wherein the beam of light impinging on the second beam deflector comprises a first portion having position information and a second portion having image information.

32. The optical processor of claim 30, wherein the differential amplifier of the controller is a servo amplifier.

33. The optical processor of claim 20, wherein the differential amplifier of the controller is a servo amplifier.

34. A scanning beam Fourier optical processor comprising:
a first rotatable mirror having a reflecting surface with a predetermined point thereon, the first mirror being rotatable about a predetermined axis lying on the reflecting surface and passing through the predetermined point thereon;
a second rotatable mirror having a reflecting surface with a predetermined point thereon, the second mirror being rotatable about a predetermined axis lying on the reflecting surface and passing through the predetermined point thereon in response to a mirror drive signal;
means for producing a beam of monochromatic light focussed to the predetermined point on the first mirror;
a Fourier optical filter disposed between the first and the second mirrors, the Fourier optical filter comprising a collimating lens, a medium having an image thereon, and a transform lens, the collimating lens collimating light incident thereon and directing the same toward the medium so as to pass therethrough at a nonvarying angle of incidence, the transform lens focussing light transmitted through the medium to the point on the second mirror;
a Fourier optical correlator disposed on a predetermined fixed reference axis that passes through the predetermined point on the second mirror;

means for moving the first mirror in a predetermined pattern about its axis to scan the beam of monochromatic light toward the collimating lens;

a controller for controlling the position of a beam of light reflected from the point on the second mirror to maintain the same on the predetermined fixed reference axis, the controller comprising:

a detector for sensing a portion of the beam reflected from the point on the second mirror and for generating a signal representative of the position thereof; and a differential amplifier for comparing the signal representative of the position of the light with a signal representative of the predetermined fixed reference axis for generating the mirror drive signal.

35. The optical system of claim 34, further comprising:

a beam splitter for splitting the light reflected from the point on the second mirror into a first and a second portion and for directing the first portion toward the detector.

36. The optical system of claim 35, wherein the first portion of the reflected light contains position information and the second portion of the reflected light contains image information derived from the medium.

37. The optical system of claim 34, wherein the differential amplifier of the controller is a servo amplifier.

38. A scanning beam Fourier optical processor, the processor having a central reference plane therethrough, the processor comprising:

a first rotatable mirror having a reflecting surface with a predetermined point thereon, the first mirror being rotatable about a predetermined axis lying on the reflecting surface and passing through the predetermined point thereon;

a second rotatable mirror having a reflecting surface with a predetermined point thereon, the second mirror being rotatable about a predetermined axis lying on the reflecting surface and passing through the predetermined point thereon in response to a mirror drive signal;

means for producing a first beam of monochromatic light focussed to the predetermined point on the first mirror;

means for producing a second beam of monochromatic light focussed to the predetermined point on the first mirror, the first and the second beam producing means each being inclined symmetrically with respect to the reference plane;

a Fourier optical filter disposed between the first and the second mirrors, the Fourier optical filter comprising a collimating lens, a medium having an image thereon, and a transform lens, the collimating lens collimating light from the first beam incident thereon and directing the same toward the transform lens and collimating light from the second beam incident thereon and directing the same through the medium toward the transform lens so that both beams pass toward the transform lens at a nonvarying angle of incidence, the transform lens focussing light in the first beam and in the second beam to the point on the second mirror;

means for moving the first mirror in a predetermined pattern about its axis to scan the first and second beams of monochromatic light toward the Fourier optical filter in respective planes each lying parallel and symmetrically disposed about the reference plane;

a controller disposed on a first predetermined fixed reference axis passing through the point on the second mirror, a Fourier optical correlator disposed on a second predetermined fixed reference axis that passes through the predetermined point on the second mirror, the first and the second reference axes being symmetrically disposed about the reference plane;

the controller controlling the position of the second mirror to control the position of the first beam of light reflected from the point on the second mirror to maintain the first beam of light on the first predetermined fixed reference axis and thereby maintain the second beam on the second predetermined fixed reference axis, the controller comprising:

a detector for sensing the first beam reflected from the point on the second mirror and for generating a signal representative of the position thereof; and a differential amplifier for comparing the signal representative of the position of the first beam of light with a signal representative of the first predetermined fixed reference axis for generating the mirror drive signal.

39. The optical processor of claim 38, further comprising;

a collimating lens disposed on the first predetermined fixed reference axis intermediate the second mirror and the controller, the collimating lens collimating light from the first beam incident thereon and directing the same toward the detector.

40. The optical processor of claim 39, wherein the collimating lens and the transform lens in the Fourier optical filter are each hyperbolic lenses.

41. The optical processor of claim 38, wherein the collimating lens and the transform lens in the Fourier optical filter are each hyperbolic lenses.

42. The optical processor of claim 38, wherein the differential amplifier of the controller is a servo amplifier.

* * * * *